A. F. CARR AND H. F. SCHOENE.
AUTOMOBILE DIRECTION INDICATOR.
APPLICATION FILED OCT. 5, 1917.

1,325,831. Patented Dec. 23, 1919.

Inventors
Almon F. Carr
Herbert F. Schoene
By Braun, Bottcher & Drenner
Attorneys

UNITED STATES PATENT OFFICE.

ALMON F. CARR AND HERBERT F. SCHOENE, OF CHICAGO, ILLINOIS, ASSIGNORS OF ONE-THIRD TO CHARLES F. GOTTSCHALK, OF CHICAGO, ILLINOIS.

AUTOMOBILE DIRECTION-INDICATOR.

1,325,831.   Specification of Letters Patent.   Patented Dec. 23, 1919.

Application filed October 5, 1917. Serial No. 194,861.

*To all whom it may concern:*

Be it known that we, Dr. ALMON F. CARR and HERBERT F. SCHOENE, citizens of the United States, residing at Chicago, in the county of Cook and State of Illinois, have invented a certain new and useful Improvement in Automobile Direction-Indicators, of which the following is a full, clear, concise, and exact description, reference being had to the accompanying drawings, forming a part of this specification.

Our invention relates to automobile direction indicators.

For driving on roads or streets bearing considerable traffic, a direction indicator for indicating the intention of the driver to turn or to stop his vehicle, has become highly desirable if not indispensable. Numerous devices have ben proposed for giving such an indication, but they have not gone into general use mainly because of their complicated structure and unsightly appearance.

It is the aim of our invention to provide a neat and simple indicator which will give an unmistakable signal. It is a further object of our invention to provide this signal in combination with the tail light or marker at the rear of the car. This is an important feature of the invention as the tail light or marker is an essential part of the automobile and a driver approaching the car from the rear can easily observe the signal. The location of the indicator in the immediate proximity of the marker or tail light serves to focus the attention upon the place where the signal will be given. I prefer to employ the light from the tail light or marker to illuminate the number or light plate of the automobile and this also serves to focus the attention upon the point where the signal or indication will be given.

Other objects will be apparent from the following detailed specification.

In the accompanying drawings which form a part of the present specification—

Figure 1:
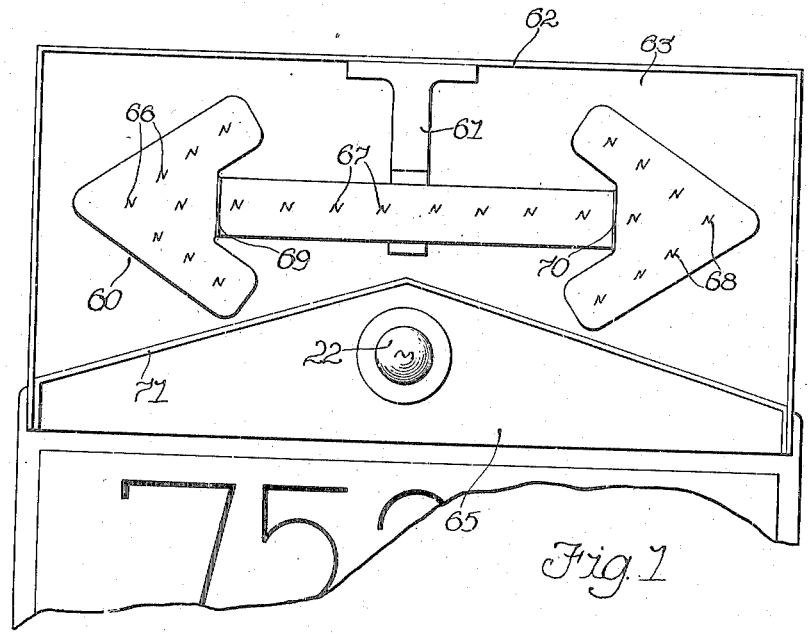
Figure 1 is a front elevation of a device embodying my invention.
Figure 2:
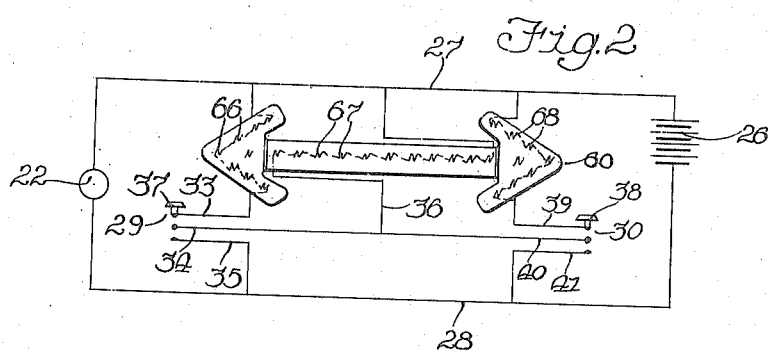
Fig. 2 is a preferred form of wiring diagram.

In Fig. 1 I have indicated a vacuum tube 60 in the form of a double headed arrow as a means for giving the direction indication. This tube is mounted in a bracket 61, suspended either from the top 62 or the back 63 of a suitable open faced box. This box also contains a compartment 65 for the tail light 22 which is placed in suitable position for giving the usual marker signal and for illuminating the number plate or license tag. An arched plate 71 separates the compartment 65 from the compartment containing the vacuum tube 60, and also functions as a reflecting surface for reflecting the light from the bulb 22 down over the license tag. The vacuum tube 60 contains a plurality of illuminating elements preferably in the form of small filaments 66 which are embodied in the glass body of the tube. The filaments 66 are electrically connected into three groups, namely, into the left hand head, the stem and the right hand head and are controlled by an electric circuit substantially as shown in Fig. 2. This tube may be made in three units instead of one unit. Where the tube is made in one unit partitions or shades 69—70 are provided to prevent light from the stem from entering the head member which is not lighted. When an indication is to be given of an intention to turn to the right, the stem and the right hand head are illuminated by lighting up the elements 67 and 68. When an indication is to be given of an intention to turn to the left, the elements 66 and 67 are lighted up.

Figure 3:
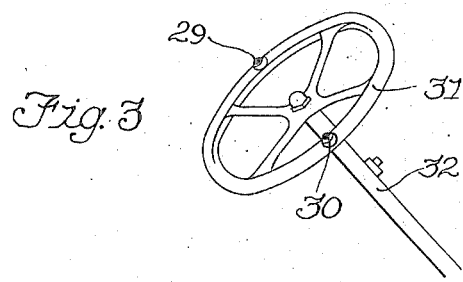
Fig. 3 is an isometric view of the steering wheel showing the controlling switches for the signal.

The circuit connections for controlling the lighting filaments 66, 67, and 68, are illustrated in the wiring diagram shown in Fig. 2. The filaments 66, 67 and 68 are connected to the battery or other source of current 26 by means of the feed wires 27 and 28 and the switches or push buttons 29 and 30. These switches or push buttons 29 and 30 are conveniently placed on the steering wheel 31 of the motor vehicle, as shown in Fig. 3, or may be placed upon the steering column 32 or in any other suitable location, as desired. The switch 29 comprises the three springs 33, 34 and 35, which are connected respectively to the filament or filaments 66, the bus 36 and the battery wire 28. The bus 36 is connected to one end of the filament 67, which is disposed in the central compartment of the arrow and illuminates the stem thereof. Thus, when the switch 29 is closed, as by depressing the button 37, the filament 67 in the stem of the arrow and the filament 66 which illuminates the head of the arrow are lighted up and a signal is given that the occupant of the vehicle intends to turn to the left. The switch 30 comprises the springs 39, 40 and 41, with the button 38, these springs being connected respectively to the filament 68, the bus 36 and the battery feed wire 28, so that when the switch is closed, the filament in the stem of the arrow and the filament 68 in the right hand head of the arrow will be illuminated, giving a signal indicating that the occupant of the vehicle intends to turn to the right. The tail light or marker 22 is unaffected by the switching of the indicator filaments above set out, this lamp being connected at all times to the battery during such time as the tail light or marker is employed.

The grouping of the double headed arrow and the tail light together is of great advantage because the tail light always fixes the point at which the signal will be given. In other words it focuses the attention of the driver of the following vehicle upon the proper point so that when the signal is given, it will be perceived. The signal may be employed equally well in day time because of the fact that the vacuum tube 60 is set back in the recess afforded by its surrounding box and therefore is but very little illuminated by light from outside sources.

The mechanical arrangement is such as to save space without interfering with the function of either the tail light or the indicator.

We do not intend to be limited to the details of construction shown or described.

We claim:

1. In an automobile signal, a glass tube molded in the form of a single double-headed arrow, said tube having a transparent front and having a plurality of lighting filaments embodied in the glass body of the tube back of the front, said filaments being adapted to be controlled to light up the stem and one head at a time only.

2. A direction signal device in the form of a hollow glass double-headed arrow, lighting filaments distributed through said device and divided into three groups, one group in each arrow-head and one group in the part joining the heads, and means for selectively illuminating the group in either arrow-head with the group in the connecting part.

3. A direction signal device comprising a hollow glass double-headed arrow, lighting filaments distributed through said device and divided into three groups, one group in each arrow-head and one group in the connecting stem, means for selectively illuminating the group in either arrow-head with the group in the stem, and means preventing the transmission of light from the stem to the unlighted arrow-head.

4. A direction signal device comprising a glass tube molded into the form of a double-headed arrow, lighting filaments distributed through said device, and divided into three groups, one group in each arrow-head and one group in the connecting stem, means for selectively illuminating the group in the stem with the group in one of the arrow-heads, and opaque partitions between the stem and the arrow-heads for preventing the transmission of light from one group of filaments to another part of the device.

5. In a device of the kind described, three associated hollow glass elements formed and arranged to present the appearance of two oppositely disposed arrow-heads joined by a stem, each of said three elements having a group of lighting filaments distributed therein, means for illuminating the filaments in the stem and simultaneously illuminating the filaments in either one of the arrow-heads.

6. In a device of the kind described, an elongated transparent hollow body, groups of lighting filaments distributed through said body, and partitions preventing the transmission of light from one group to another.

7. In a device of the kind described, a series of transparent walled chambers, formed and arranged to constitute a direction indicator, and filaments within the chambers for illuminating same.

In witness whereof, we hereunto subscribe our names this 3rd day of October, A. D. 1917.

Dr. ALMON F. CARR.
HERBERT F. SCHOENE.